Patented Nov. 7, 1950

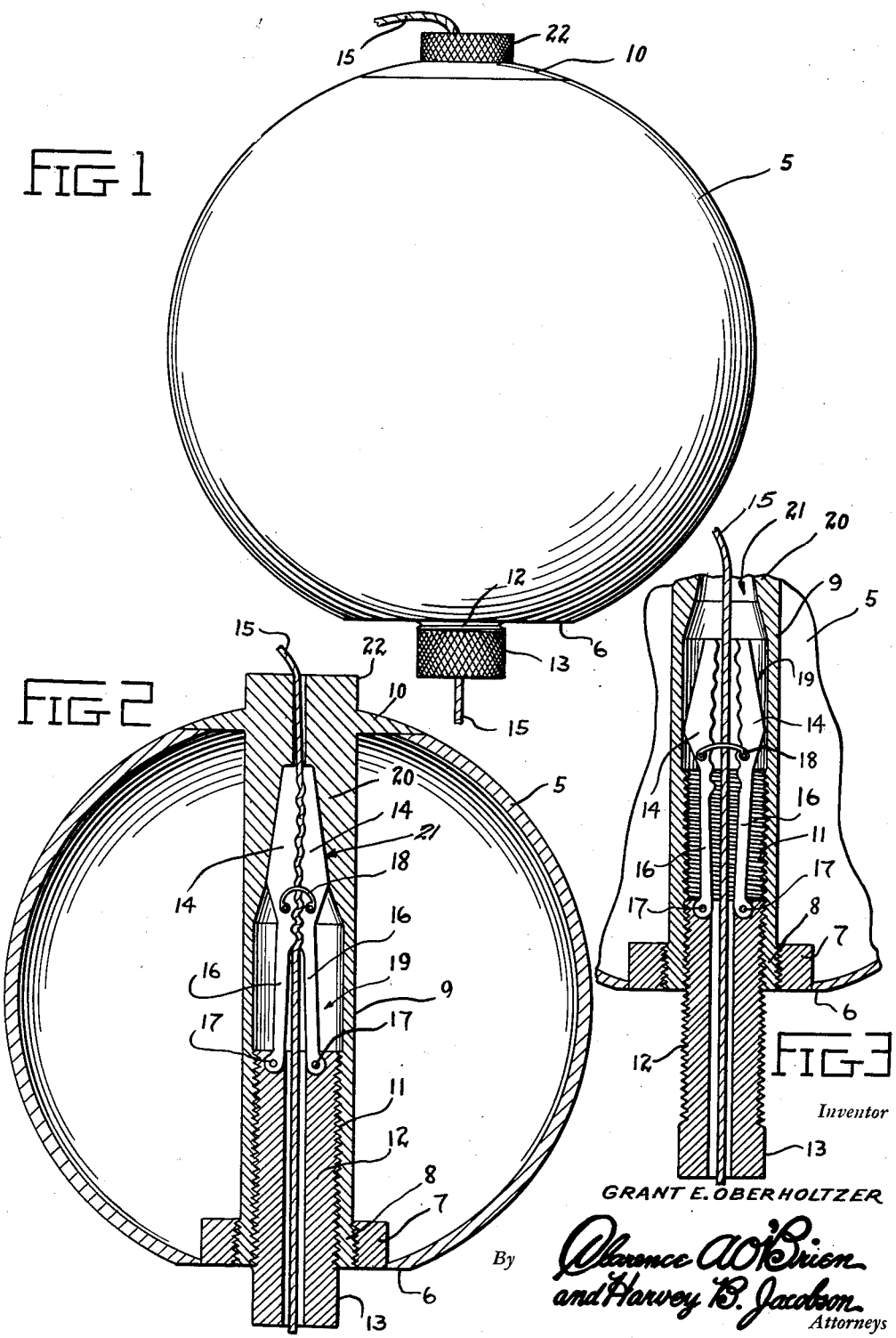

2,529,179

UNITED STATES PATENT OFFICE 2,529,179

CASTING FLOAT FOR RODS AND REELS

Grant E. Oberholtzer, Fitchburg, Mass.

Application November 15, 1946, Serial No. 710,193

2 Claims. (Cl. 43—44.91)

The present invention relates to a novel and improved float for use in connection with a rod and reel and fishing line carried by said rod and reel, and has reference, in particular, to a float embodying means whereby said float may be adjustably clamped, at a desired point, on the fishing line.

One object of the invention is to provide a float embodying conveniently usable and practical means through the medium of which said float may be regulated and temporarily fastened to the line in a manner to permit the fisherman to utilize either a so-called short line or a long line, whichever is thought best for effective results when fishing with casting rod and reel equipment.

Another object of the invention is to provide a float in the form of a spherical ball and to provide said float, at a desired point, with weight means, this to render the float sufficiently heavy, as a unit, to permit the fisherman to cast it and the bait long distances, an accomplishment not attainable when using ordinary light weight bobs and floats.

A still further object has to do with a weighted float of the aforementioned type wherein the weighted area provides a normal bottom and through the medium of which said float is properly balanced within itself and is thus adapted to maintain an upright position when floating atop the water.

Further, in carrying out the specific principles of the invention, I have provided a float which is simple and expedient in construction, is adjustably securable on the fishing line, and which enables a fisherman, using a casting rod, to fish effectively with worms, minnows, and similar bait due to the fact that it is possible to cast the baited line relatively long distances to what are believed to be choice spots for fishing and to better fulfill the requirements of a fisherman in need of a float of the type herein shown, described and claimed.

Other objects, features, and advantages of the invention will become more readily apparent from the following description and the accompanying illustrative drawings.

In the drawings, wherein like numerals are employed to designate like parts throughout the views:

Figure 1 is an elevational view of a float constructed in accordance with the principles of the present invention.

Figure 2 is a central section, with certain parts in elevation.

Figure 3 is a fragmentary central sectional view based on Figure 2, illustrating the fishing line disengaged from the line-clamping means.

Referring now to the drawings by distinguishing reference numerals, it will be seen that the float proper is denoted by the numeral 5 and that it is in the form of a substantially spherical, hollow, water-tight ball of suitable material. Although I have shown the float hollow and spherical, it is obvious that it may be of any desired shape, solid, and constructed from cork or equivalent buoyant material. The bottom 6 of the float is flattened as shown and provided with a rigidly mounted nut 7 which, for the most part, is located interiorly of the float. The nut serves as an anchoring element and also as a weight. That is to say, it serves to anchor the lower, screw-threaded end portion 8 of a tubular fitting or insert 9, the tube extending thru the ball and having a flange 10 at its upper end secured to a portion of the float. The lower end of the tube or insert 9 terminates flush with the bottom of the anchoring and assembling nut 7 and is internally screw-threaded, as at 11, to accommodate the threads of a screw-threaded bushing 12 which is adjustably mounted in place, as shown. The lower, outer end of the bushing is suitably milled or knurled, as at 13, to provide a finger-grip and normally protrudes beyond the base of the ball to permit convenient access to be had for adjustment purposes. The bushing, at its inner end, is provided with a pair of tapered or wedge-formed jaws 14 having serrated faces to satisfactorily grip the fishing line 15. The jaws are carried by shank members 16 pivotally and hingedly connected as at 17 to the inner end of the adjusting bushing. The jaws are normally spread apart by a suitable spring 18 connected to same. In order that the jaws may be spread apart to release their grip on the line, they are moved down into the expanding chamber 19 of said tube 9. A thickened portion 20 is formed in the upper end portion of the tube 9 and provided with a longitudinally tapered bore 21 which functions to close the jaws and bind same against the line when said jaws are in the position seen in Figure 2. The upper end of the tube 9, above the flange 10, protrudes slightly and is fashioned into suitably knurled finger-gripping means 22.

It is obvious that when the bushing 12 is withdrawn to the projecting position seen in Figure 3, the jaws are likewise withdrawn from the contracting bore 21, whereupon the spring means comes into play to spread the jaws and to release the line. When the bushing 12 is threaded home, as seen in Figure 2, the serrated gripping surfaces of the jaws then grip and retain the line securely.

I shall not attempt to enumerate explicitly fine points of the trade or other commercial aspects such as have to do with the sale and use of angler's accessories and equipments. In fact, it is thought that the objects recited in the introductory portion of the description, the illustration of the construction in the drawings, and the description of the parts will enable the reader to clearly understand the nature, purposes and adaptability of a float of the form described.

In view of the foregoing description taken in conjunction with the accompanying drawings, it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claims.

I claim:

1. A casting float of the class described comprising a hollow ball having a centrally located open-ended tube for passage of the fishing line, said tube being internally screw-threaded, a screw-threaded bushing threaded into the internal screw threads of said tube, said bushing having its outer end exposed and formed into a finger-grip, and a pair of line-clamping jaws hingedly connected to the inner end of said bushing, a weight-forming and tube-anchoring nut mounted in said float and defining the normal bottom of the float, one end portion of said tube being anchored in said nut and spring means for spreading the jaws normally apart, said tube having a tapered bore in the upper end thereof for coaction with the jaws in a manner to close same and secure the fishing line therebetween.

2. A casting float of a weighted type for rod and reel comprising a hollow spherical ball having central top and bottom portions flattened and apertured, a nut anchored in the flattened apertured bottom of said float and located essentially within the confines of said float, a centrally bored tube extending axially through said float and through the upper apertured flattened end portion of the float, the upper end of said tube protruding beyond said apertured upper portion and having a flange coacting with and closing the top aperture, the lower end of said tube being externally screw threaded and screwed into said nut, said tube being internally screw threaded at its lower end and a portion of the bore having tapered surfaces, a screw threaded bushing threaded into the internal threads of said tube, said bushing having its lower end exposed beyond the ball and formed into a finger grip, said bushing being centrally bored to allow the passage of the fishing line therethrough and through the bore in said tube, a pair of fishing line clamping jaws hingedly mounted on the inner end of said bushing and confined in the bore of said tube and having beveled surfaces coacting with the tapered surfaces to provide a cam closing action for the jaws, and spring means connected to and for spreading the jaws normally apart.

GRANT E. OBERHOLTZER.

REFERENCES CITED

The following references are of record in the file of this patent:

UNITED STATES PATENTS

| Number | Name | Date |
| --- | --- | --- |
| 434,026 | Seiders et al. | Aug. 12, 1890 |
| 2,221,437 | Allison | Nov. 12, 1940 |
| 2,223,823 | Hampton | Dec. 3, 1940 |

FOREIGN PATENTS

| Number | Country | Date |
| --- | --- | --- |
| 566,054 | Great Britain | Dec. 12, 1944 |